Jan. 2, 1962     E. P. G. WRIGHT ET AL     3,015,755
ELECTRONIC EQUIPMENT PRACTICE
Filed March 27, 1956     8 Sheets-Sheet 1
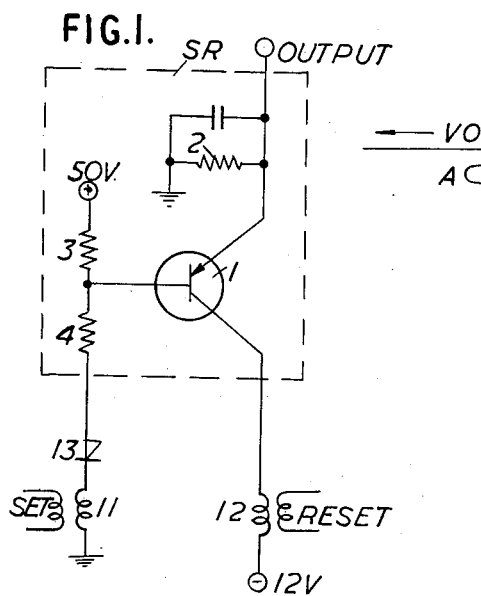
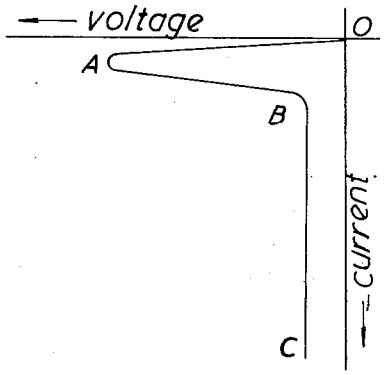
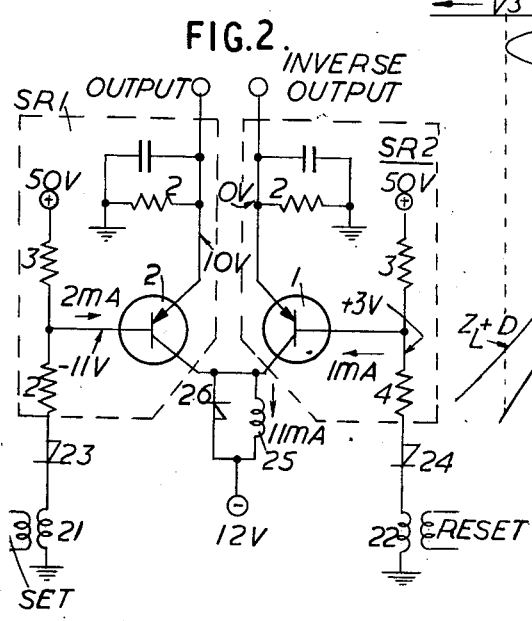
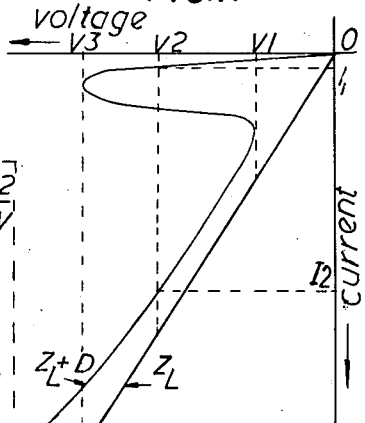
*Inventors*
E. P. G. WRIGHT-
A. D. ODELL-
C. PARKER
By
*Attorney*

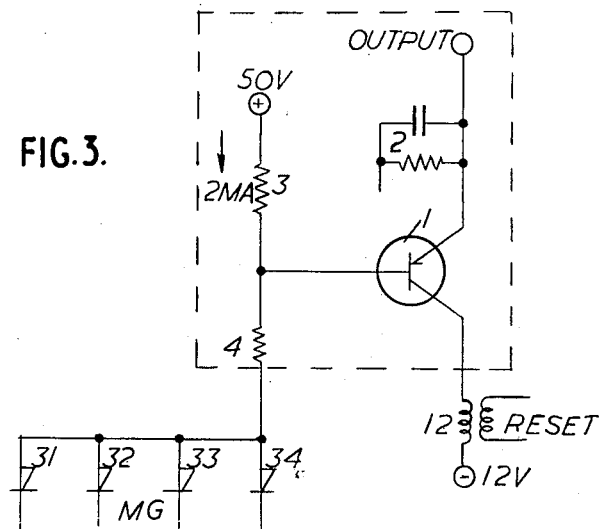
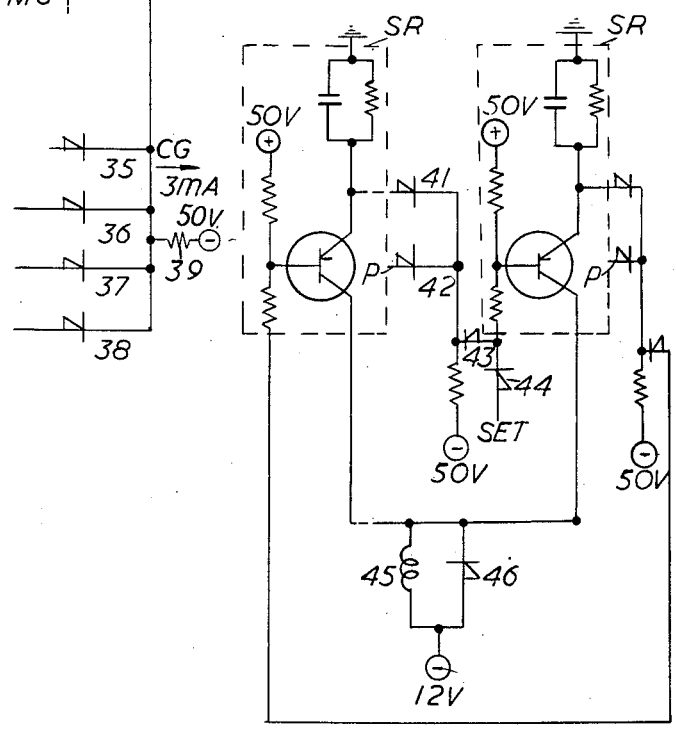

Jan. 2, 1962  E. P. G. WRIGHT ET AL  3,015,755
ELECTRONIC EQUIPMENT PRACTICE
Filed March 27, 1956  8 Sheets-Sheet 5

*Inventors*
E. P. G. WRIGHT-
A. D. ODELL-
C. PARKER
By
*Attorney*

Jan. 2, 1962  E. P. G. WRIGHT ET AL  3,015,755
ELECTRONIC EQUIPMENT PRACTICE
Filed March 27, 1956  8 Sheets-Sheet 6
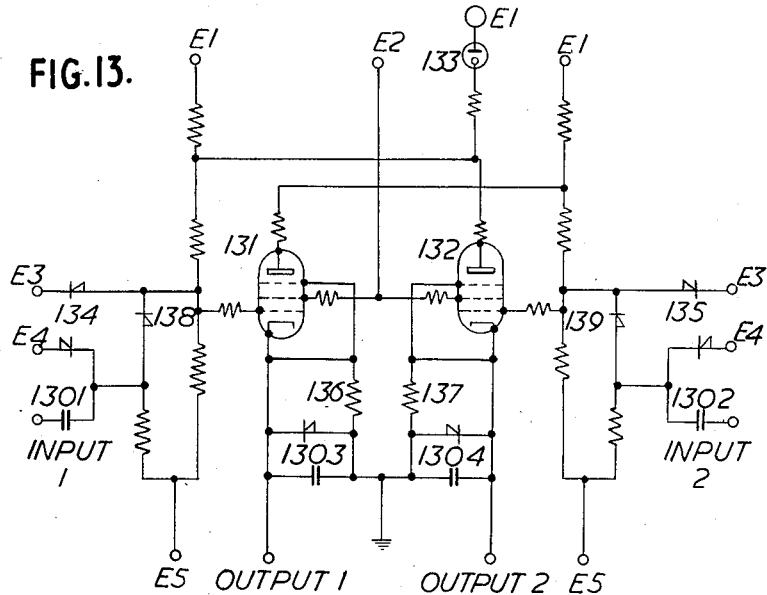
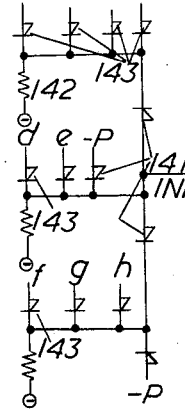
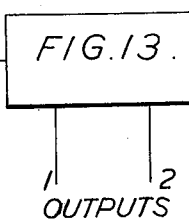
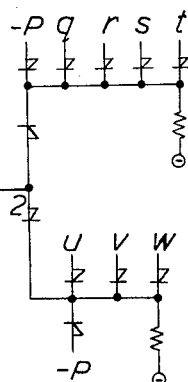
Inventors
E. P. G. WRIGHT-
A. D. ODELL-
C. PARKER
By
Robert H Harding Jr
Attorney Jan. 2, 1962 E. P. G. WRIGHT ET AL 3,015,755
ELECTRONIC EQUIPMENT PRACTICE
Filed March 27, 1956 8 Sheets-Sheet 7

Inventors
E. P. G. WRIGHT-
A. D. ODELL-
C. PARKER
By
Attorney

Jan. 2, 1962 E. P. G. WRIGHT ET AL 3,015,755
ELECTRONIC EQUIPMENT PRACTICE
Filed March 27, 1956 8 Sheets-Sheet 8

Inventors
E. P. G. WRIGHT-
A. D. ODELL-
C. PARKER
By
Robert T Harding Jr.
Attorney

United States Patent Office 3,015,755
Patented Jan. 2, 1962

3,015,755
ELECTRONIC EQUIPMENT PRACTICE
Esmond Philip Goodwin Wright, Alexander Douglas Odell, and Cecil Parker, London, England, assignors to International Standard Electric Corporation, New York, N.Y.
Filed Mar. 27, 1956, Ser. No. 574,214
Claims priority, application Great Britain Mar. 31, 1955
4 Claims. (Cl. 317—101)

This invention relates to equipment practice in electronic equipment. The object of the invention is to rationalise and standardise so far as possible the successive stages of equipment assembly.

It is by no means unknown for functional units to be designated capable of being assembled in various combinations for different purposes. It is also known for instance, in telephone exchange systems to mount hundreds of similar relay panels and their associated switches in a uniform layout on mounting racks.

The present invention develops this technique to a degree so far unknown and in a way which makes for substantial additional economy in capital expenditure and in speed and cost of maintenance.

The invention has been conceived in relation to electronic equipment functioning entirely on a digital basis. Such equipments comprise a basic on-off circuit. Varying numbers of such circuits can be interconnected in varying ways to perform different complex functions such as (a) Bi-stable or multi-stable registers comprising two or more on-off circuits so interconnected that any one, and one only of said circuits, is on at a time, and that the register can be switched from any one setting to any other;

(b) Counting chains which are registers similar to (a) but in which the switch circuits are only operable in a given cyclic order;

(c) Pattern registers comprising a number of switch circuits so interconnected that any combination of said switch circuits can be operated and the pattern changed at will;

(d) Binary counters comprising a number of interconnected stages each of which comprises two switch circuits connected in parallel as a bi-stable register.

The basic on-off circuit is usually based on a significant electronic device which itself has on-off characteristics such as a hard valve, a gas tube, a transistor, but the on-off circuit will also include resistors, and/or capacitors, and/or rectifiers, etc. Nevertheless it is possible to build on-off circuits comprising a number of components all having individual functions of the same order as described in British Patent No. 727,415, published March 20, 1955.

In designing each different functional device ab initio, considerations of efficiency and economy will usually lead to minor variations in the components and/or interconnections of the basic on-off circuit.

Nevertheless, it has been found that with little sacrifice of either efficiency or economy, a standard on-off circuit can be designed which can be incorporated in any functional unit of the types under consideration.

Furthermore, for most purposes the interconnecting circuits between every two stages of a given functional unit can all be identical, although of course, they will differ as between the different functional units.

One aspect of the invention comprises a group of electronic on-off units each consisting of an interconnected aggregation of electronic components and capable of being built as a unit into any electronic functional device having a digital basis, a plurality of sub-groups of which units are each interconnected by further electronic equipment to form a like plurality of electronic functional devices having a common digital basis, which devices are in turn interconnected to form a complete electronic equipment having a complex functional purpose.

While from the aspect already considered the invention is presented as limited to equipment with a digital basis, when one considers the physical as apart from the functional side of the invention, an equipment practice has been evolved which is not necessarily limited to that basis.

Another aspect of the invention comprises a mounting rack comprising a number of identical sub-panels each carrying a set of inter-connected electronic components and sub-assemblies of electrical components each connected to one or more of said sub-panels whereby one or more subpanels together with one or more sub-assemblies form a complete functional unit, and interconnections between a number of such functional units to constitute a complete equipment each and every functional part of which has as its basis said standard sub-panel.

Yet another aspect of the invention comprises a mounting rack carrying electronic equipment comprising a rectangular frame carrying a number of identical parallel jack-strips or the like, flat subpanels, which are jacked one into each jack-strip or the like and which carry sets of electronic components the components of each set being wired to each other and to plugs at one edge of and in the plane of the respective sub-panel, and complementary sub-assemblies of electronic components, mounted on said frame and wired to said jack strips or the like so as to form with said sub-panels a complete functional unit or a plurality of functional units interconnected to form a complete equipment.

The invention will be clearly understood from the following description of certain embodiments shown in the accompanying drawings in which:

FIG. 1 shows an electronic on-off switch comprising a transistor.

FIG. 2 shows a bi-stable trigger circuit utilising the on-off switch of FIG. 1.

FIG. 3 shows the control of an on-off switch according to FIG. 1 via coincidence gates.

FIG. 4 shows a one-at-a-time train of on-off switches according to FIG. 1 for use as a counter or register.

FIG. 6 shows a characteristic curve of a gap diode.

FIG. 7 shows a characteristic curve of a gap diode in series with a resistor.

FIG. 13 shows a bi-stable trigger circuit using two pentodes and constituting as a whole a basic circuit which is used in FIGS. 14 and 15 as a basic circuit of a binary register and a pulse distributor respectively.

FIG. 16 shows schematically an equipment practice for mounting circuits of the type shown in the previous drawings, while

Figure 5:
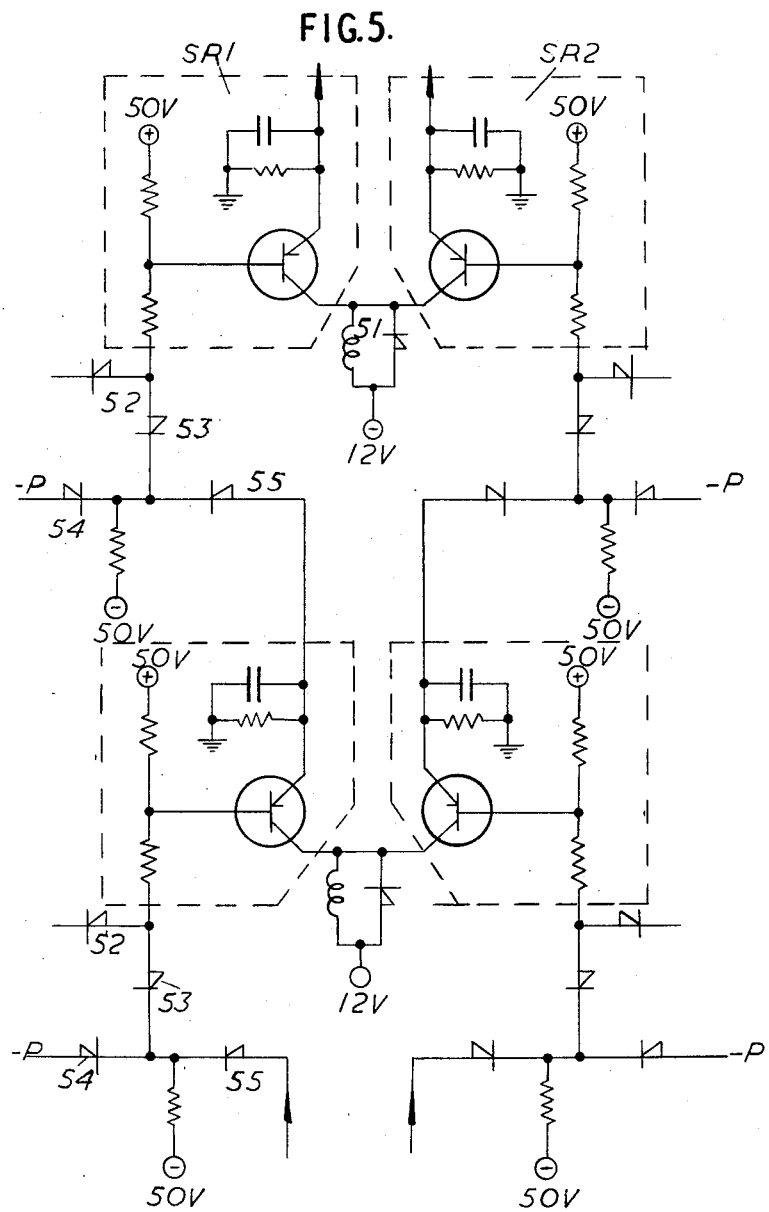
FIG. 5 shows a pattern-movement register using FIG. 1 switches.

Since this invention deals with equipment technique and not with operational features, so long as the circuits involved are well-known or so long as references to a published description is given, it is unnecessary to do other than make a brief reference to the purpose and uses of the circuits involved.

Referring now to FIG. 1 the characteristic component is the crystal triode or transistor and FIG. 1 shows a circuit including a transistor which is capable of taking up either an on or an off condition.

That portion of FIG. 1 which lies within the dotted rectangle constitutes the basic circuit of the on-off switch which recurs in all applications of the switch. The two transformers 11, 12 are added to illustrate setting and resetting.

The basic circuit comprises a transistor 1 having current gain. The transistor base is connected to a potentiometer 3, 4 and the emitter is connected to an output lead to which is connected a resistor-capacitor coupling 2.

The circuit is set to the "on" position by a negative pulse on the base via a transformer 11 and a blocking rectifier 13, and the output appears at the emitter.

It is reset to the "off" position by a positive pulse on the collector via transformer 12.

In the "off" state the emitter is at earth while the base is held at the potential at about +6 volts by virtue of the current flowing from the positive supply through the secondary of the transformer 11. The emitter is therefore effectively negative with respect to the base.

A negligible current flows from the base to emitter while a small but significant current flows between the base and collector. This base collector current with emitter cut off is a characteristic of present transistors and to maintain a stable "off" position, it is necessary that it shall not cause the potential of the base to approach the point at which emitter current begins to flow. This requirement can be met in practice by arranging that the resistance as "seen" by the base is sufficiently low.

Consider now the effect of the pulse applied to the primary of transformer 11, the polarity being such that the base of the transistor is driven negative by an amount which causes a forward current to flow between emitter and base. If the current gain of the transistor under these conditions exceeds a limiting value which will be considered later, a regenerative action occurs in which a greater current flows out of the base to the collector than into the base from the emitter. This causes the base to move in a negative direction, and the action persists after the triggering pulse has terminated and results in a large current flow between the emitter and collector. This current charges the capacitor of coupling 2 and the emitter and base move negatively together until equilibrium is reached with the said capacitor charged to a potential slightly less than that of the negative supply. This constitutes the "on" condition, in which the collector current is the sum of the base and emitter currents. For stability the current gain in the "on" state must exceed the ratio of the collector to emitter currents. Fortunately, it is relatively easy to achieve this condition.

Resetting is achieved by making the collector positive with respect to the emitter. This effectively terminates conduction in the transistor, the base moves positively and the emitter moves towards earth with the time constant of the coupling 2. With the transistors available at present, it is necessary to allow a finite time for current conduction to cease, and therefore there is a minimum width of pulse and a minimum emitter time-constant for satisfactory re-setting. An analogy exists in the deionisation time of a gas tube.

FIG. 2 shows a circuit in which two basic switch circuits SR1, SR2 draw their collector currents through the impedance 25 in parallel with a rectifier 26 which are common to both collectors. Both bases are connected to setting transformers 23, 24 and each switch is automatically reset to the "off" position when the other is triggered to the "on" position. This circuit forms a bi-stable triggered pair. The voltages and currents in the figure illustrate the condition prevailing with the switch SR1 conducting, or "on," and SR2 "off." If a suitable negative pulse is applied to the base of SR2, this transistor will be driven into its "on" position and the voltage between collector and emitter will fall to the "bottomed" state. The emitter cannot move since it is held initially at earth, and the collector of SR2 (and hence of SR1) is therefore raised to a volt or two below earth. Prior to triggering SR2 the "on" current of SR1 flowed through inductance 25: subsequently this current is available to charge the emitter capacitor of SR2. Providing the inductance is large the current through it will not change appreciably, and the said capacitor will charge nearly linearly to the point at which the collector voltage on SR2 equals the supply voltage. At this point rectifier 26 conducts and prevents any appreciable further negative movement. Providing the width of the triangular positive pulse at the collectors is sufficient, i.e. providing the capacitor is large enough, SR1 will have been reset and the voltage across its capacitor will rise exponentially to earth with the time-constant of the coupling 2. Alternative outputs are available from SR1 and SR2 respectively.

The principle can readily be extended to include a chain of static registers having a common resetting connection. In this case, when any switch is "on" all other switches in the chain will be "off"; this implies that only one switch in the chain will be "on" at any time, and is the basis of various counter and distributor circuits.

Connection between switches is made by rectifier gates which operate in conjunction with a source of continuous pulses suitable for triggering. Each switch receives its triggering pulse via a gate, and the presence of a pulse at the gate output is made to depend on the state of other switches which act as controls.

The lower part of FIG. 3 illustrates a coincidence gate CG. Assuming perfect rectifiers the voltage at the output of CG towards MG will be equal to the most positive of the inputs 35–38 (providing the most positive input is itself more positive than the battery voltage). As an example consider inputs 35–37 as derived from sources each having the values either zero or $-10$ volts and input 38 as a master negative pulse, moving between zero and $-10$ volts. As long as any one of inputs 35–37 is at zero, the output will be held at zero, but if all of 35–37 are at $-10$ volts, the gate output will follow the voltage of input 38 and will thus reproduce the master negative pulse. A combination of input potentials 35 to 37 may in this way be caused to control the transmission of a master pulse between the terminal of input 38 and the output terminal.

The middle portion MG of FIG. 3 shows how the output from two or more coincidence circuits CG can be combined by means of the second type of gate, the mixing gate. If the inputs from different coincidence gates to all inputs 31–34 have the values either zero or $-10$ volts; the operation can be described as follows:

The output to SR will be at $-10$ volts if any one input is at $-10$ volts, otherwise it will be at earth.

The switch SR is triggered from gate MG. A current of the order 2 mA flows from the positive battery towards the base of the transistor. Some of this current will flow to the collector, and the remainder will pass via the blocking rectifiers 31–34 and the respective resistors 39 to negative battery. The additional current to the negative battery to make up the 3 mA indicated in the drawing, will be drawn from rectifiers such as 35–38 and providing that at least one of the controlling inputs is at earth during the master pulse, no appreciable change in voltage will occur at the base of the transistor. If however, all the controlling inputs are at $-10$ volts, then when the master pulse occurs, the "additional current" referred to will cause the base to move negatively and thus trigger the transistor.

It should be noted that the output circuit of the switch SR is capacitative and will accordingly present a low impedance to short duration pulses such as would be employed as the master pulse source. This fact is of considerable importance since it allows a large number of coincidence gates to be controlled by a single register.

FIG. 4 illustrates the use of coincidence gates to provide the functions of a scale of N counter or distributer.

FIG. 4 is a pattern movement register formed from trigger pairs, the output from one pair controlling the input to the next pair in line. In this way the condition of each pair is successively transferred to the next pair at intervals determined by the master pulse. The scale-of-N counter employs single switches SR with a common resetting circuit, 45, 46 and gate couplings to form a ring. Only one switch SR is conducting at a time, and each master switch pulse resets the conducting switch when the next switch in the ring is operated, in the manner explained in respect of FIG. 3. Consecutive switches are interconnected by coincidence gates 41, 42 each controlled from the previous emitter and from a stepping pulse source —P. Thus the only switch which will operate in response to a pulse is that switch immediately succeeding a conducting switch. In response to a train of pulses from source —P, the consecutive switches will operate in turn, the operation of each switch automatically resetting the previous switch.

FIG. 5 is a pattern movement register formed from trigger pairs of the FIG. 2 type, the output from one pair controlling the input to the next pair in line. In this way the condition of each pair is successively transferred to the next pair at intervals determined by the master pulse.

There are two methods of operating the individual switches, one to insert information, and the other to step or move a pattern along the register, the idle position of which is with all the right hand (or left hand) switches conducting. Potential applied via any one or more rectifiers 52 to corresponding left-hand switch will operate said switches and automatically cause the corresponding right-hand switch to become non-conducting. When such a pattern of operated and non-operated left-hand switches exists, pulses applied to all left-hand and right-hand rectifiers 44 will, in conjunction with the potential via the corresponding rectifiers 45 from the preceding switches, cause the pattern to be stepped forward one step as a whole in response to each pulse.

Referring now to FIGS. 6–11 the name "gap diode" is applied to recently-developed solid-state devices having voltage-current characteristics similar to that shown in FIG. 6. Over the range O to A the device shows a high positive resistance; from A to B a high negative resistance; from B to C a low positive resistance. These are described in British Patent No. 746,490, published March 14, 1956. If a gap diode is connected in series with a fixed positive resistance of suitable value the voltage current characteristic assumes the shape shown in FIG. 7. From this it can be seen that for applied voltages less than $V_1$ the current is single-valued and low. For voltages above $V_3$ the current is single-valued and high. For intermediate voltages, such as $V_2$, the current has three possible values, but one of these values is unstable and in practice therefore, the circuit has two stable electrical states in the region between $V_1$ and $V_3$.

Figure 8:
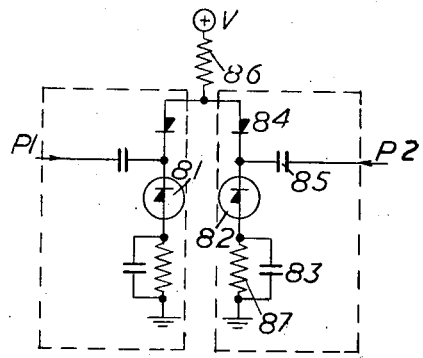
FIG. 8 shows a bi-stable trigger circuit using gap diodes, in which two identical basic circuits are indicated.
Figure 9:
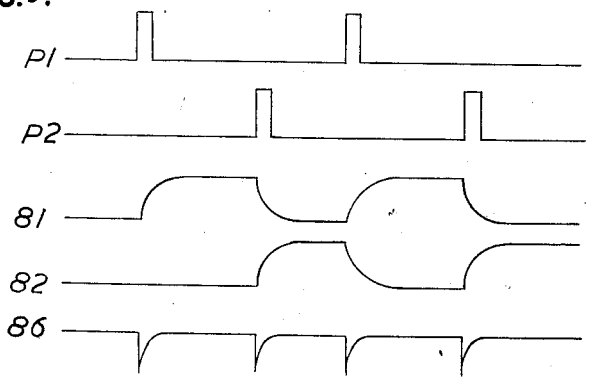
FIG. 9 shows a voltage wave form occurring in the circuit of FIG. 8.

FIG. 8 shows the circuit of a simple bi-stable trigger which has been tested at speeds up to 200 kc. Two gap diodes 81, 82 are employed each with a lead resistor 83 and rectifier 84 in series. The function of the rectifiers is to present a high impedance path to positive-going triggering pulses, and a low impedance path when the diode is in the closed condition.

Positive pulse P1, P2 can be independently applied via condensers such as 85 to diodes 81, 82 respectively. Resistance 86 is inserted in the supply voltage lead so that it is common to both diodes. The diode load resistances 83 are shunted by condensers 87. The operation of the circuit will be described with reference to FIG. 9. It will be assumed that the characteristics of diodes 81, 82 are similar and that the potential V is adjusted to just below the "make" turnover point (just below $V_3$ in FIG. 7). When this voltage is applied both diodes will be "open." If a positive pulse P1 of suitable amplitude and width is applied to diode 81, its rectifier will block and the potential across 81 will be raised to the turnover point. Provided the total circuit resistance is less than the incremental negative resistance of 81 at this point, the diode will then close as shown by wave-form 81, FIG. 9. If a similar pulse P2 is now applied, diode 82 will close as shown by wave-form 82, FIG. 9. When either diode closes, a negative pulse is generated across resistance 86 as indicated by wave-form 86, FIG. 9, thus opening the other diode. This pulse has a sharp leading edge and an exponential trailing edge.

Figure 10:
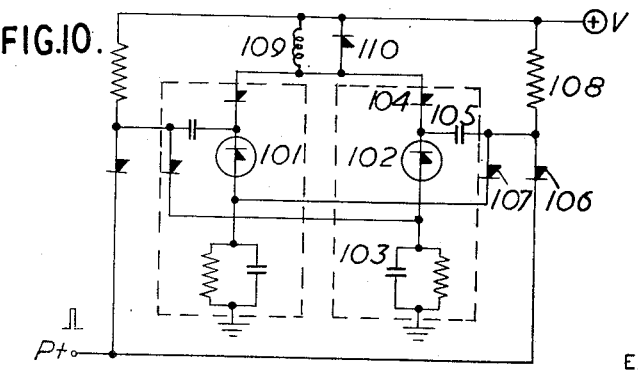
FIG. 10 shows an alternative bi-stable trigger circuit using the same basic circuits as FIG. 8.

In the previous bi-stable trigger circuit, triggering pulses are applied alternatively to each tube of the pair, FIG. 10 shows a method whereby two coincidence gates may be employed to direct positive pulses from a common pulse train +P alternatively to one side or the other of a flip-flop pair. Operation of these circuits is as follows:

As before, each diode 101, 102 has a resistor-capacitor coupling 103 to earth, connected to a first electrode and rectifier 104 to a second electrode. Each second electrode is connected via a condenser 105 to (1) via a rectifier 106 to a common pulse source +P (2) to the first electrode of the other diode via the rectifier 107, and (3) to the power supply +V via a resistor 108. The rectifiers 104 are connected in common by an inductance 109 and the rectifier 110 to potential +V. Assume diode 101 closed and diode 102 open. Current will flow from the supply potential V through the two parallel paths 108, 106 to the source +P. It is assumed that this source has a low output impedance and will therefore be at earth potential between pulses. If a positive pulse now occurs on the common line, the rectifier 106 will block. Since diode 101 is closed, a voltage nearly equal to V will be dropped across R1. The right-hand rectifier 107 will be blocked and a potential is developed across 102 which, if the potential of V is suitably chosen, will trigger 102, and thus open 101. The next pulse on the common line will find conditions reversed, and will trigger 101 and open 102.

Figure 11:
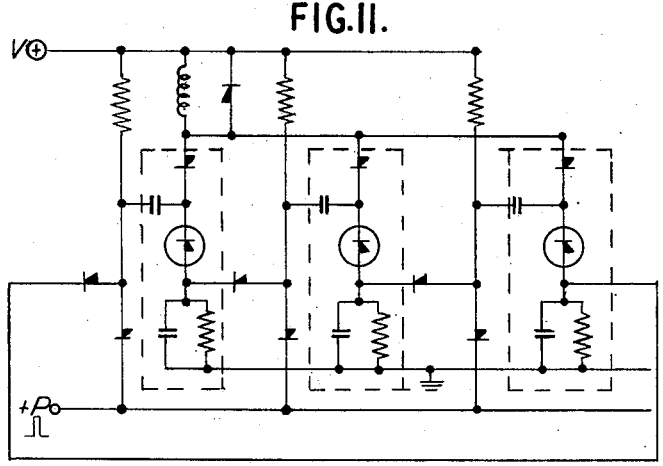
FIGS. 11 and 12 show respectively a counting circuit, and a pattern movement register utilising the same basic circuit as FIG. 8.

A simple extension of the gating principle described in respect of FIG. 10 enables any number of diodes to be coupled together as shown in FIG. 11, to form a counting chain in which only one diode is closed at a time, and the remainder open. Successive pulses on the common pulse lead will successively open the conducting diode and close the next one to it in the chain.

Figure 12:
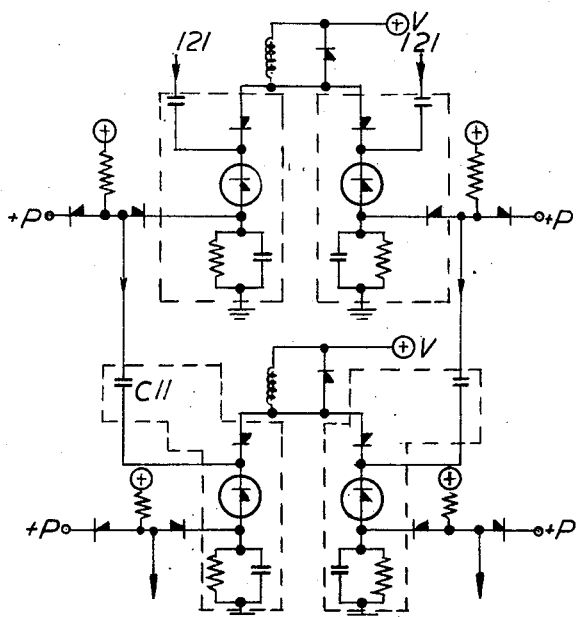

FIG. 12, shows one method in which pairs of diodes each forming a bi-stable triggered circuit, may be connected to form a chain such that either diode of each pair may be closed. Each pulse on the common pulse lead, plus P, operates to change the state of every pair to the state previously registered by the pair immediately preceding it in the chain. Coincidence gating is employed between stages. Since only one diode is closed in each pair only one pulse will be passed to the next pair. If the diode receiving the pulse is already closed, no change is registered; if open, then that diode will be triggered. In order to insert a pattern, each element of the pattern will be inserted at the entrance of the register; for instance, via the lead 121 one or other of which would be pulsed to insert each element, and between elements the common pulse applied to the +P leads would step the partially inserted pattern forward one step to make room for the next element. This is similar in operation to the pattern movement register of FIG. 5. Each stage comprises two basic circuits identical to those of FIGS. 8, 10 and 11.

Up to now the basic circuits have each comprised a single major switch device with associated minor components. Certain types of equipment can be completely built up on a basic circuit consisting of a bi-stable trigger device and FIG. 13 shows such a device.

FIG. 13 shows a symmetrical bi-stable trigger element comprising pentodes 131, 132 which are cross-connected in a conventional manner to provide a circuit having two stable electrical states, i.e. with either 131 conducting and 132 non-conducting or vice versa. It will be seen that five different voltages (to earth) are indicated for the operation of the pentodes and the diode 133; these may be for particular tubes; E1, +300; E2, +170; E3, +25; E4 (variable bias) 0 to —25; E5, —200. Rectifiers 134, 135 associated with the grids of 131, 132 respectively limit the excursion of grid voltage to $E_3$ (+25 volts) when the appropriate valve is in the conducting condition. The presence of resistors 136, 137 in the cathode circuits of 131, 132 respectively allow the grids to reach a potential of +25 volts without grid current. The choice of suitable values for R1 and R2 allows each valve to act as a normal pentode switch between control grid, cathode and anode, with the addition of a cathode-follower action between control grid, cathode and screen grid.

The negative excursion of the grids is arrested by rectifiers 138, 139 to give a defined trigger sensitivity. Positive triggering pulses can be applied from input 1 or input 2 via capacitors 1301, 1302. Outputs 1 and 2 are taken across resistors 136, 137 respectively to control rectifier coincidence and mixing gates and the output from such gates may be caused to operate other trigger elements. Rectifiers 1303 and 1304 prevent the cathodes from being taken below earth under load and minimise the effects of loading on trigger sensitivity. A neon indicator 133 can be included as an aid to maintenance.

FIG. 14 shows the basic trigger circuit of FIG. 13 in block form with each input controlled by multiple gating circuits.

Input 1 is controlled by three parallel gating circuits connected by means of blocking rectifiers 141. Each gating circuit comprises a resistor shunted on parallel circuits each including a gating rectifier 143. Separate control circuits are connected to the respective gating lead, one of the controls in each case being the same master control pulse —P. When all the control leads off all the parallel gating circuits are simultaneously at the required potential, potential —P will be applied to input 1 to operate tube 131.

In the same way input 2 is controlled by two parallel gating circuits each involving a master control pulse lead, and when coincidence occurs on all the control leads the marked pulse —P will be applied to tube 132 to operate 132 and so deenergise 131.

Figure 15:
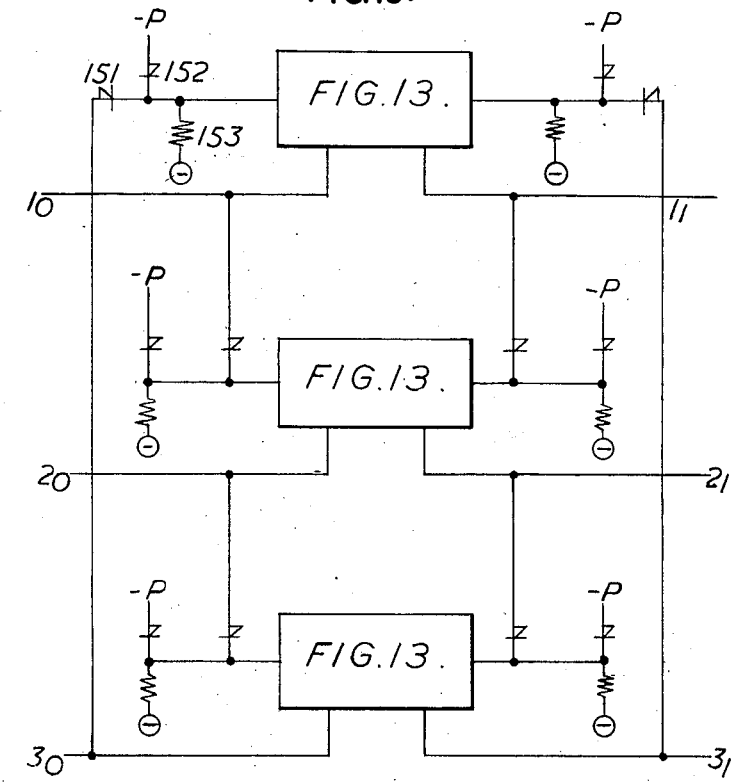

FIG. 15 shows how a plurality of basic bi-stable trigger circuits FIG. 13 may be interconnected to form a pulse-distributor and shifting pattern register. The outputs from each basic circuit, FIG. 13, are connected to the respective inputs of the next circuit under control of the master pulse —P by means of rectifier-resistance gates 151, 152, 153. As shown the chain of trigger circuits is closed, the outputs from the last circuit being connected to the first circuit, but alternatively the chain could be open.

It will be seen that in the sets of examples previously described, there is in each case a plurality of the basic circuits interconnected via a number of electrical components, the number of components and the type of each component varying according to the function performed by the equipment in question. In other words, throughout the equipments in each set, basic circuits are invariable, but interconnecting circuits are variable.

Figure 16:
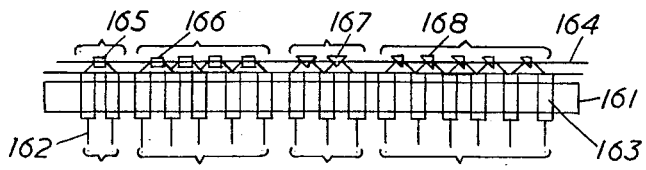
Figure 17:
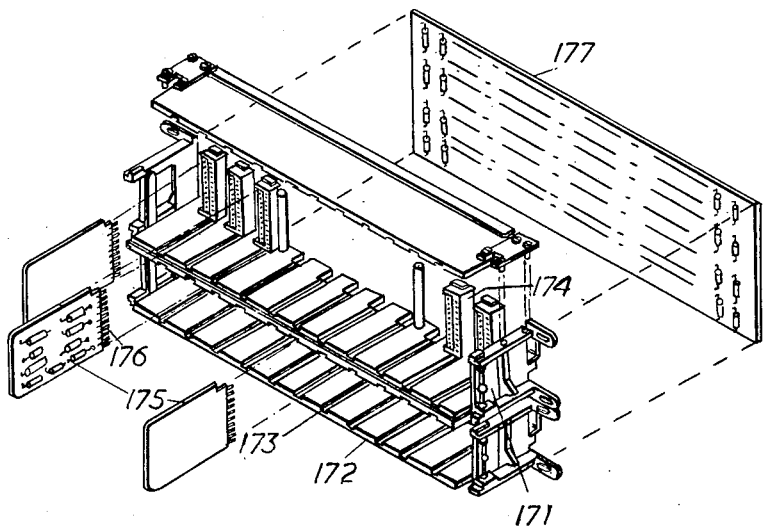
FIG. 17 shows a rack construction implementing the equipment practice indicated in FIG. 16.

The manner of mounting such equipments is shown schematically in FIG. 16 and in detail in FIG. 17. In FIG. 16, 161 indicates the plan outline of a vertical equipment rack carrying horizontal rows of jack strips 163. The invariable basic circuits are mounted on a standard flat insulating panel 162 which has plugs along one edge in the plane of the panel, and each of which is jacked into one of the jack strips on the rack.

On the back of the rack, behind a row of jack strips is mounted an apparatus panel 164 on which are mounted the variable circuits required to complete the various types of equipment to be built up from various groups of the basic circuits jacked into the row of jack strips and also to interconnect these equipments.

Thus in FIG. 16, the panel 164 is shown as carrying three different types of interconnected circuits, interconnected respectively by a circle 165; squares 166; isosceles triangles 167; and right-angled triangles 168. The circle is indicated as being wired between the two left-hand panels 162 to form a bi-stable trigger circuit; the four squares are shown as wired between the next five basic panels 162 to form a counter; the two isosceles triangle circuits are wired between the next three basic circuits to form a binary counter; the last six panels are interconnected by the right angled triangle circuits 168 to form a pattern register. The last nine panels 162 each carry two invariable basic circuits, each panel being capable of carrying two circuits if required, and having sufficient plug capacity for this purpose. It must be understood however, that if desired each panel can be of the capacity to carry one basic circuit only.

Referring now to FIG. 17, the rack 171 has a number of horizontal shelves 172, slotted top and bottom at 173. Between the shelves at the rear side of the rack, are mounted vertical jack strips 174, each aligned with a pair of slots in the adjacent shelves. Panels 175 each carrying a row of plugs 176 along one edge in line with the panel are adapted to slide in a co-operating pair of slots in adjacent shelves, so that they with other plugs enter the corresponding jack strips.

Panel 177 carries the interconnecting circuits and is screwed on the back of the rack adjacent to the jack strips to which jack strips the circuits on the panel are wired.

The necessary power supplies and pulse supplies are also wired to the jack strips. Not only are individual equipments internally connected via the back panel 177, but the various equipments are interconnected to form a complete working system as required.

While the principles of the invention have been described above in connection with specific embodiments, and particular modifications thereof, it is to be clearly understood that this description is made only by way of example and not as a limitation on the scope of the invention.

What we claim is:

1. A mounting rack comprising a plurality of identical sub-panels, each sub-panel carrying a set of electronic components interconnected in substantially identical circuits, a common panel carrying a plurality of sub-assemblies of mutually distinct electronic components thereon, means for connecting each sub-assembly to at least one of said sub-panels whereby said subpanels together with said sub-assemblies form a complete electronic functional unit, and means on said common panel for interconnecting a given number of such functional units to constitute a complete electronic equipment each and every functional part of which has as its basis the standard sub-panel.

2. A mounting rack according to claim 1 and comprising a frame carrying rows of identical jack-strips, the sub-panels being jacked into said jack-strips from one side of the frame, and the common panel being removably mounted on the other side of said frame and connected to said jack strips.

3. A mounting rack carrying electronic equipment comprising a frame carrying a plurality of identical jack-strips, a plurality of sub-panels each of which carries substantially identical sets of interconnected electronic components, conductive input and output plugs on one edge of each sub-panel for insertion into the jack-strips, a common panel removably mounted on said frame, said common panel carrying a plurality of sub-assemblies of mutually distinct electronic components thereon, means for connecting each sub-assembly to at least one of said jack strips whereby said sub-panels together with said sub-assemblies form a complete electronic functional unit, and means on said common panel for interconnecting a given number of such functional units to constitute a complete electronic equipment, each and every functional part of which has as its basis a standard sub-panel.

4. A mounting rack as claimed in claim 3 in which there are a plurality of interchangeable and different common panels for formulating a variety of functional units, each having as its basis the standard sub-panels.

References Cited in the file of this patent

UNITED STATES PATENTS

| | | |
|---|---|---|
| 2,226,745 | Schrack | Dec. 31, 1940 |
| 2,566,425 | Paine et al. | Sept. 4, 1951 |
| 2,628,270 | Himmel | Feb. 10, 1953 |
| 2,657,318 | Rack | Oct. 27, 1953 |
| 2,676,271 | Baldwin | Apr. 20, 1954 |
| 2,762,987 | Mackey | Sept. 11, 1956 |
| 2,799,837 | Powell | July 16, 1957 |
| 2,832,013 | Pedersen | Apr. 22, 1958 |
| 2,895,366 | Schneeberger | July 21, 1959 |

OTHER REFERENCES

Article: Formica Copper Clad for Better Printed Circuits; The Formica Company, Form 457, 1954; pages 2–11.